United States Patent
Kugel et al.

(10) Patent No.: US 10,239,277 B2
(45) Date of Patent: Mar. 26, 2019

(54) FLEXIBLE MICROSPHERE ARTICLES HAVING HIGH TEMPERATURE STABILITY

(71) Applicant: 3M INNOVATIVE PROPERTIES COMPANY, St. Paul, MN (US)

(72) Inventors: Alexander J. Kugel, Woodbury, MN (US); John C. Clark, Maplewood, MN (US); Vivek Krishnan, St. Paul, MN (US); Christopher B. Walker, Jr., St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/117,494

(22) PCT Filed: Feb. 13, 2015

(86) PCT No.: PCT/US2015/015828
§ 371 (c)(1),
(2) Date: Aug. 9, 2016

(87) PCT Pub. No.: WO2015/123526
PCT Pub. Date: Aug. 20, 2015

(65) Prior Publication Data
US 2016/0347026 A1 Dec. 1, 2016

Related U.S. Application Data

(60) Provisional application No. 61/939,534, filed on Feb. 13, 2014, provisional application No. 61/973,357, filed on Apr. 1, 2014.

(51) Int. Cl.
| | |
|---|---|
| *B32B 3/16* | (2006.01) |
| *B32B 27/14* | (2006.01) |
| *B32B 27/40* | (2006.01) |
| *B32B 7/00* | (2019.01) |
| *B32B 7/02* | (2019.01) |
| *B32B 7/12* | (2006.01) |
| *B32B 9/00* | (2006.01) |
| *B32B 27/00* | (2006.01) |
| *B32B 27/06* | (2006.01) |
| *B32B 27/08* | (2006.01) |
| *B32B 27/18* | (2006.01) |
| *B32B 27/20* | (2006.01) |
| *B32B 27/28* | (2006.01) |
| *B32B 3/00* | (2006.01) |
| *B32B 3/30* | (2006.01) |

(52) U.S. Cl.
CPC ............ *B32B 3/16* (2013.01); *B32B 3/00* (2013.01); *B32B 3/30* (2013.01); *B32B 7/00* (2013.01); *B32B 7/02* (2013.01); *B32B 7/12* (2013.01); *B32B 9/00* (2013.01); *B32B 27/00* (2013.01); *B32B 27/06* (2013.01); *B32B 27/08* (2013.01); *B32B 27/14* (2013.01); *B32B 27/18* (2013.01); *B32B 27/20* (2013.01); *B32B 27/28* (2013.01); *B32B 27/286* (2013.01); *B32B 27/40* (2013.01); *B32B 2260/00* (2013.01); *B32B 2260/025* (2013.01); *B32B 2264/00* (2013.01); *B32B 2307/308* (2013.01); *B32B 2307/50* (2013.01); *B32B 2307/546* (2013.01); *B32B 2451/00* (2013.01)

(58) Field of Classification Search
CPC .......... B32B 2260/00; B32B 2260/025; B32B 2264/00; B32B 2307/308; B32B 2307/50; B32B 2307/546; B32B 2451/00; B32B 27/00; B32B 27/06; B32B 27/08; B32B 27/14; B32B 27/18; B32B 27/20; B32B 27/28; B32B 27/286; B32B 27/40; B32B 3/00; B32B 3/16; B32B 3/30; B32B 7/00; B32B 7/02; B32B 7/12; B32B 9/00
USPC ......................................... 428/425.6; 528/76
See application file for complete search history.

(56) References Cited

U.S. PATENT DOCUMENTS

| | | | |
|---|---|---|---|
| T987,003 I4 | 10/1979 | Johnson | |
| 4,849,265 A | 7/1989 | Ueda | |
| 5,422,162 A * | 6/1995 | Passarino | ............... E01F 9/506 |
| | | | 359/536 |
| 5,620,775 A | 4/1997 | LaPerre | |
| 5,882,771 A * | 3/1999 | Klein | .................... B60R 13/10 |
| | | | 359/529 |

(Continued)

FOREIGN PATENT DOCUMENTS

| | | |
|---|---|---|
| AU | 2013200418 | 11/2013 |
| CN | 101980867 | 2/2011 |

(Continued)

OTHER PUBLICATIONS

International Search Report for PCT International Application No. PCT/US2015/015828, dated Apr. 23, 2015, 4 pages.

*Primary Examiner* — Thao T Tran
(74) *Attorney, Agent, or Firm* — Qiang Han

(57) ABSTRACT

There is provided an article a binder resin layer comprising an aliphatic polyurethane polymer comprising a plurality of soft segments, and a plurality of hard segments, where the soft segments comprise poly(alkoxy) polyol, and where the poly(alkoxy) polyol is essentially free of crosslinker; and a plurality of microspheres partially embedded and adhered to a first major surface of the binder resin layer, wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C.

20 Claims, No Drawings

(56) References Cited

U.S. PATENT DOCUMENTS

| | | | |
|---|---|---|---|
| 5,959,775 A * | 9/1999 | Joseph | C08G 18/10 |
| | | | 359/536 |
| 5,976,669 A | 11/1999 | Fleming | |
| 6,156,436 A | 12/2000 | Joseph et al. | |
| 8,420,217 B2 | 4/2013 | Johnson | |
| 2008/0139722 A1 | 6/2008 | Shefelbine | |

FOREIGN PATENT DOCUMENTS

| | | |
|---|---|---|
| EP | 0683268 | 11/1995 |
| EP | 0863813 | 9/1998 |
| WO | WO 2009/145961 | 12/2009 |
| WO | WO 2014-055828 | 4/2014 |
| WO | WO 2014-210249 | 12/2014 |

* cited by examiner

FLEXIBLE MICROSPHERE ARTICLES HAVING HIGH TEMPERATURE STABILITY

CROSS REFERENCE TO RELATED APPLICATIONS

This application is a national stage filing under 35 U.S.C. 371 of PCT/US2015/015828, filed Feb. 13, 2015, which claims the benefit of U.S. Provisional Application No. 61/939,534, filed Feb. 13, 2014, and U.S. Provisional Application No. 61/973,357, filed Apr. 1, 2014, the disclosure of which are incorporated by reference in their entirety herein.

FIELD

This disclosure relates to flexible microsphere articles having high temperature stability.

BACKGROUND

Decorative protective surfaces find many consumer applications. Household appliances, automotive interiors and paints, consumer electronic devices, such as laptops and hand held devices, and apparel, such as clothing and footwear, are all examples where consumers prefer materials that deliver considerable protection from scratches, wear and abrasion while retaining high cosmetics and aesthetics through the material's lifecycle. High quality conformable surfaces that are free of cracks and/or other defects when used in a broad temperature range are of particular interest to many consumers because of their aesthetic appeal.

Durable decorative laminates and films comprised of glass beads are broadly known. These low gloss constructions typically consist of exposed glass bead surfaces that impart high durability and decorative properties to the construction. Low friction properties of such constructions have also been disclosed. For example, U.S. Pat. No. 4,849,265 (Ueda) discloses decorative abrasion resistant laminates that contain hard microspheres (glass or plastic) that are either exposed or surface coated with a thin polymer coating. Another example is U.S. Pat. No. 5,620,775 (LaPerre), which discloses durable, low coefficient of friction polymeric films made by having an exposed glass bead surface with glass. Another example is U.S. Pat. No. 8,420,217 (Johnson) which discloses elastic bonding films that include an elastic, thermoset core layer and a thermoplastic bonding layer on each side of the core layer, where the thermoset core layer is a polyurethane formed as the reaction product of (i) a multifunctional isocyanate with (ii) a combination of polyols comprising (a) polyester diol, (b) crosslinker, and (c) hard segment.

There is a need for flexible microspheres articles having high temperature stability that have a low coefficient of friction, resistant to organic solvents, and are also free of visible defects.

SUMMARY

The present disclosure provides flexible microsphere articles having high temperature stability that have a low coefficient of friction, resistance to organic solvents, and are also free of visible defects. In one aspect, the present disclosure provides the following embodiments:

In one aspect, the present disclosure provides an article comprising: a binder resin layer comprising an aliphatic polyurethane polymer comprising a plurality of soft segments, and a plurality of hard segments, wherein the soft segments comprise poly(alkoxy) polyol, and wherein the poly(alkoxy) polyol is essentially free of crosslinker; and a plurality of microspheres partially embedded and adhered to a first major surface of the binder resin layer, wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C.

In some embodiments the amount of hard segments is 15 to 85 percent by weight, the amount of soft segments is 15 to 85 percent by weight, and the total amount of the hard and soft segments being at least 80 percent by weight, the weights being based on the weight of the polyurethane polymer. In some embodiments, the article has a change in storage modulus of less than 7 MPa from 25° C. to 175° C. In some embodiments, the article has a change in storage modulus of less than 5 MPa from 25° C. to 175° C.

In some embodiments, the article has a storage modulus at 175° C. of greater than 0.2 MPa. In some embodiments, the article has a storage modulus at 175° C. of greater than 1 MPa. In some embodiments, the storage modulus at 175° C. of the article is greater than 3 MPa. In some embodiments, the plurality of microspheres is selected from at least one of glass, polymers, glass ceramics, ceramics, metals and combinations thereof.

In some embodiments, at least about 60% of the surface of the article is covered with the plurality of microspheres. In some embodiments, the article further comprises a second layer disposed along the second major surface of the first binder layer. In some embodiments, the second layer comprises a flexible material. In some embodiments, the article is flexible.

In some embodiments, the article is resistant to organic solvents. In some embodiments, the article exhibits a coefficient of friction of less than or equal to 0.3. In some embodiments, the article is heat bonded at elevated temperatures to a substrate.

In some embodiments, the soft segments have a number average molecular weight of less than 10,000 g/mol, and wherein the hard segments are derived from diols having molecular weights of less than 600 g/mol. In some embodiments, the soft segments have a number average molecular weight of at least 500 g/mol. In some embodiments, the soft segments have a number average molecular weight of 500 g/mol to 6,000 g/mol. In some embodiments, the soft segments have a number average molecular weight of 500 g/mol to 3,000 g/mol.

In some embodiments, the binder resin layer has a thickness of 50 to 600 micrometers, and includes microspheres having an average diameter of about 30 to 200 micrometers. In some embodiments, the polyurethane polymer contains less than 20 percent by weight hard segments and 15 to 90 percent by weight soft segments. In some embodiments, the total amount of hard and soft segments in the polyurethane polymer is at least 80 percent by weight of the polymer.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

The term "decorative article" as used herein means articles that have a coefficient of retro reflection of less than or equal to 1.0 candelas/lux/square meter. In some preferred embodiments, the presently disclosed articles have a coefficient of retro reflection of less than or equal to 0.5 candelas/lux/square meter. In some more preferred embodiments, the presently disclosed articles have a coefficient of retro reflection of less than or equal to 0.1 candelas/lux/square meter.

The term "flexible" as used herein means that the material being tested passes the Flexibility Testing test method disclosed hereinafter.

The present disclosure provides articles having at least a first surface that includes a first binder layer selected from at least one of linear resins and resins having low cross link densities, where the first binder layer has a first major surface opposite a second major surface; and a plurality of microspheres at least partially embedded in and adhered to the first major surface of the first binder layer. In some embodiments, it is preferred that the article is thermoformable or stretchable. In order for the article to be thermoformable or stretchable, the materials in the article, such as the first binder layer, must have certain properties. An exemplary test method for determining the stretchability is included in the tensile test conducted according to ASTM D882-10. In some embodiments, it is preferable that the article is free of visual defects, such as for example inhomogeneities (bubbles, dark spots, light spots, and the like).

The other criterion for the article to be formable is that it can bear the elongation that occurs during forming or stretching without failing, cracking, or generating other defects. This can be achieved by using materials that have a temperature at which they undergo melt flow and forming near that temperature. In some cases, crosslinked materials that do not flow can be used, but they are more likely to crack during the elongation. To avoid this cracking, the crosslink density should be kept low, as can be indicated by a low storage modulus in the rubbery plateau region. The expected degree of crosslinking can also approximated as the inverse of the average molecular weight per crosslink, which can be calculated based on the components of a material. In addition, in some embodiments forming can be conducted at relatively low temperatures, since as temperatures increase above the glass transition temperature of crosslinked materials, their capacity for elongation begins to decrease.

Transfer Carrier

The transfer coating method of the present disclosure can be used to form the presently disclosed microsphere transfer article from which can be formed the presently disclosed microsphere article. The microsphere article has a surprisingly improved aesthetics.

The presently disclosed transfer carrier includes a support layer and a thermoplastic release layer bonded thereto. The thermoplastic release layer of the transfer carrier temporarily partially embeds a plurality of transparent microspheres. The transfer carrier has low adhesion to the plurality of transparent microspheres and to the binder layer in which the opposite sides of the plurality of transparent microspheres are at least partially embedded, so that the transfer carrier can be removed to expose the surface of the plurality of transparent microspheres.

Support Layers

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful support layer for the presently disclosed transfer article. If the support layer is a thermoplastic layer it should preferably have a melting point above that of the thermoplastic release layer of the transfer carrier. Useful support layers for forming the transfer carrier include but are not limited to those selected from at least one of paper and polymeric films such as biaxially oriented polyethylene terephthalate (PET), polypropylene, polymethylpentene and the like which exhibit good temperature stability and tensile so they can undergo processing operations such as bead coating, adhesive coating, drying, printing, and the like.

Thermoplastic Release Layers

Useful thermoplastic release layers for forming the transfer carrier include but are not limited to those selected from at least one of polyolefins such as polyethylene, polypropylene, organic waxes, blends thereof, and the like. Low to medium density (about 0.910 to 0.940 g/cc density) polyethylene is preferred because it has a melting point high enough to accommodate subsequent coating and drying operations which may be involved in preparing the transfer article, and also because it releases from a range of adhesive materials which may be used as the binder layer, in addition to the plurality of transparent microspheres.

The thickness of the thermoplastic release layer is chosen according to the microsphere diameter distribution to be coated. The binder layer embedment becomes approximately the mirror image of the transfer carrier embedment. For example, a transparent microsphere which is embedded to about 30% of its diameter in the release layer of the transfer carrier is typically embedded to about 70% of its diameter in the binder layer. To maximize slipperiness and packing density of the plurality of microspheres, it is desirable to control the embedment process so that the upper surface of smaller microspheres and larger microspheres in a given population end up at about the same level after the transfer carrier is removed.

In order to partially embed the plurality of transparent microspheres in the release layer, the release layer should preferably be in a tacky state (either inherently tacky and/or by heating). The plurality of transparent microspheres may be partially embedded, for example, by coating a plurality of transparent microspheres on the thermoplastic release layer of the transfer carrier followed by one of (1)-(3): (1) heating the microsphere coated transfer carrier, (2) applying pressure to the microsphere coated transfer carrier (with, for example, a roller) or (3) heating and applying pressure to the microsphere coated transfer carrier.

For a given thermoplastic release layer, the microsphere embedment process is controlled primarily by temperature, time of heating and thickness of the thermoplastic release layer. As the thermoplastic release layer is melted, the smaller microspheres in any given population will embed at a faster rate and to a greater extent than the larger microspheres because of surface wetting forces. The interface of the thermoplastic release layer with the support layer becomes an embedment bonding surface since the microspheres will sink until they are stopped by the dimensionally stable support layer. For this reason it is preferable that this interface be relatively flat.

The thickness of the thermoplastic release layer should be chosen to prevent encapsulation of most of the smaller diameter microspheres so that they will not be pulled away from the binder layer when the transfer carrier is removed. On the other hand, the thermoplastic release layer must be thick enough so that the larger microspheres in the plurality of transparent microspheres are sufficiently embedded to prevent their loss during subsequent processing operations (such as coating with the binder layer, for example).

Microspheres

Microspheres useful in the present disclosure can be made from a variety of materials, such as glass, polymers, glass ceramics, ceramics, metals and combinations thereof. In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Mo., and glass available under the trade designation "PYREX" from Corning Incorporated, New York, N.Y.

The grinding process yields a wide distribution of glass particle sizes. The glass particles are spherodized by treating in a heated column to melt the glass into spherical droplets, which are subsequently cooled. Not all the beads are perfect spheres. Some are oblate, some are melted together and some contain small bubbles.

Microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

In some embodiments, microspheres useful in the present disclosure are transparent and have a refractive index of less than about 1.60. In some embodiments, the microspheres are transparent and have a refractive index of less than about 1.55. In some embodiments, the microspheres are transparent and have a refractive index of less than about 1.50. In some embodiments, the microspheres are transparent and have a refractive index of less than about 1.48. In some embodiments, the microspheres are transparent and have a refractive index of less than about 1.46. In some embodiments, the microspheres are transparent and have a refractive index of less than about 1.43. In some embodiments, the microspheres are transparent and have a refractive index of less than about 1.35 or less.

When the article is stretched during a forming process, the relative positions of the microspheres on the surface of the first binder layer will change. It is preferred that the change in position of the microspheres results in substantially uniform spacing. Substantially uniform spacing occurs when the distance between individual microspheres tends to increase as the article is deformed. This is in contrast to a less preferred situation when the distance between clusters of microspheres increases, but individual microspheres tend to remain close to each other. Also, if cracking occurs in the binder layer of an article, then gaps will grow between clusters of microspheres, and substantially uniform spacing will not occur. In some embodiments, the article can be elongated in one direction but not in another such that the microspheres tend to increase in separation in the direction of elongation but not increase in separation in the orthogonal direction. In this case, the resulting microspheres have substantially uniform spacing even though microspheres have relatively high separation in the direction of stretching but low separation in the orthogonal direction. Substantially uniform spacing is identified by observing the average distance between microspheres along any straight line on the surface of the film with a uniform distance between microspheres indicates uniform spacing. The average distance between microspheres when comparing two different lines in different directions on the surface of the film do not need to be similar to have substantially uniform spacing.

While not wishing to be bound by theory, it is believed that when microspheres are randomly applied in a full monolayer on a surface, they naturally have substantially uniform spacing because they are packed reasonably closely. However, if microspheres are randomly applied with lower area coverages, such as between 30% and 50% coverage, then they do not necessarily produce uniform spacing. For example, in some cases, clusters of several microspheres can form either by random or by electrostatic attraction leaving other areas on the surface void of microspheres. By first forming a more densely packed layer of microspheres and subsequently stretching the surface of the article, a more uniform spacing of microspheres can occur compared to a random placement of microspheres.

Particle Sizing

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening. It is desirable to use as broad a size range as possible to control economics and maximize the packing of the microspheres on the binder layer surface. However, some applications may require limiting the microsphere size range to provide a more uniform microsphere coated surface. In some embodiments, a useful range of average microsphere diameters is about 5 micrometers to about 200 micrometers (typically about 35 to about 140 micrometers, preferably about 35 to 90 micrometers, and most preferably about 38 to about 75 micrometers). A small number (0 to 5% by weight based on the total number of microspheres) of smaller and larger microspheres falling outside the 20 to 180 micrometers range can be tolerated. In some embodiments, a multi-modal size distribution of microspheres is useful.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening. For our purposed the average cross-sectional diameter can be effectively measure by using the following stack of sieves.
U.S. Sieve Designation No.
Nominal Opening (micrometers).
80 180
100 150
120 125
140 106
170 90
200 75
230 63
270 53
325 45
400 38
500 25
635 20

Alternately, average diameter can be determined using any commonly known microscopic methods for sizing particles. For example, optical microscopy or scanning electron microscopy, and the like, can be used in combination with any image analysis software. For example, useful software includes that commercially available as free ware under the trade designation "IMAGE J" from NIH, Bethesda, Md.

Adhesion Promoter

In some embodiments, the microspheres are treated with an adhesion promoter such as those selected from at least one of silane coupling agents, titanates, organo-chromium complexes, and the like, to maximize their adhesion to the first binder layer, especially with regard to moisture resistance.

The treatment level for such adhesion promoters is on the order of 50 to 1200 parts by weight adhesion promoter per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the adhesion promoter with the microspheres, followed by drying in a tumbler or auger-fed dryer to prevent the microspheres from sticking together. One skilled in the art would be able to determine how to best treat the microspheres with an adhesion promoter.

Binder Layer

The binder layer (also referred to as the "first binder layer" or the "binder resin layer") is typically an organic polymeric material. It should exhibit good adhesion to the transparent microspheres themselves or to the treated microspheres. It is also possible that an adhesion promoter for the microspheres could be added directly to the binder layer itself as long as it is compatible within the process window for disposing the binder layer on the surfaces of the microspheres. It is important that the binder layer has sufficient release from the thermoplastic release layer of the transfer carrier to allow removal of the transfer carrier from the microspheres, which are embedded on one side in the thermoplastic release layer and on the other side in the first binder layer.

Binders useful in the binder layer include, but are not limited to those selected from at least one of the following linear materials: polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof. In some embodiments, the polymer matrix composites include nanoparticles in resins, fibers in resins, and the like. Combinations can include any combinations of materials, such as interpenetrating networks, dual cure systems, and the like. In some preferred embodiments, the linear material selected for the binder layer is a polyurethane or a fluoropolymer. In a most preferred embodiment, the linear material selected for the binder layer is an aliphatic polyurethane polymer or fluoroplastic, such as for example, those fluorothermoplastics having a melting point of 110-126° C. and based on a copolymer of tetrafluoroethylene, hexafluoropropylene, and vinylidene fluoride, available under the trade designation 3M DYNAMAR Polymer Processing Additive FX 5912 from 3M Company, St. Paul, Minn.

In some embodiments, the presently disclosed articles have binder layers that are not crosslinked or are very lightly crosslinked. Lightly crosslinked materials can be useful over highly crosslinked materials when it desirable to produce articles having less elastic recovery energy after being deformed in the forming process. Also, lightly crosslinked materials tend to accommodate higher degrees of elongation before failing compared to highly crosslinked materials. In some embodiments, non-crosslinked materials are preferred to give very high degrees of elongation. In some embodiments, lightly crosslinked materials are useful over non-crosslinked materials to give better resistance to chemicals and resistance to creep and other dimensional instability over time.

In some embodiments, the article includes an elastic layer coupled with a thermoplastic layer that has a relatively low forming temperature. Polycarbonate and polycarbonate blends, thermoplastic polyurethane (TPU), non-crystalline PET such as amorphous PET or PETG are some exemplary thermoplastics.

In some embodiments, the present disclosure provides binder resin systems, including polyurethane dispersions, two component (or also referred to herein as "2K") urethanes coated from solvent, 100% solids two component urethanes and two layer urethanes. The binder layer can be formed, for example, out of solution, aqueous dispersion, or 100% solids coating such as via hot melt or extrusion. The binder layer may be transparent, translucent, or opaque. It may be colored or colorless. The binder layer may, for example, be clear and colorless or pigmented with opaque, transparent, or translucent dyes and/or pigments. In some embodiments, inclusion of specialty pigments, such as for example metallic flake pigments, can be useful.

In some embodiments, a binder resin layer useful in the present disclosure includes an aliphatic polyurethane polymer comprising a plurality of soft segments, and a plurality of hard segments. In some embodiments, the soft segments are poly(alkoxy) polyol. In some embodiments, the poly(alkoxy) polyol is preferably essentially free of crosslinker. "Essentially free of crosslinker" as used herein means that there is not an effective amount of crosslinker present in the composition that comprises the binder resin layer. For example, this may be less than or equal to 1.0 percent by weight of crosslinker based on the total weight of the composition that comprises the binder resin layer.

In some embodiments, the specific chemical identities and relative amounts of the hard and soft segments and moieties of the hard and soft segments are sufficient to impart a glass transition temperature of 10° C. or less and a storage modulus that changes less than 15 MPa from 25° C. to 175° C. In some embodiments, the soft segments have a number average molecular weight of less than 10,000 g/mol. In some embodiments, the hard segments are derived from diols having molecular weights of less than 600 g/mol. In some preferred embodiments, the soft segments have a number average molecular weight of less than 10,000 g/mol, and the hard segments are derived from diols having molecular weights of less than 600 g/mol. In some embodiments, the soft segments have a number average molecular weight of at least 500 g/mol. In some preferred embodiments, the soft segments have a number average molecular weight of 500 g/mol to 6,000 g/mol, and more preferably between 500 g/mol to 3,000 g/mol. In some preferred embodiments, the soft segments have a number average molecular weight of 500 g/mol to 6,000 g/mol, and more preferably between 500 g/mol to 3,000 g/mol, and the hard segments are derived from diols having molecular weights of less than 600 g/mol.

In some embodiments, the amount of hard segments is 15 to 85 percent by weight based on the total weight of the composition that comprises the binder resin layer. In some embodiments, the amount of soft segments is 15 to 85 percent by weight based on the total weight of the composition that comprises the binder resin layer. In some embodiments, the total amount of the hard and soft segments is at least 80 percent by weight based on the total weight of the composition that comprises the binder resin layer. In some embodiments, the composition from which the binder resin layer is derived contains less than 20 percent by weight hard segments and 15 to 90 percent by weight soft segments. In some embodiments, the composition from which the binder resin layer is derived contains a total amount of hard and soft segments in the polyurethane polymer of at least 80 percent by weight of the polymer.

In an even more preferred embodiment, the amount of hard segments is 15 to 85 percent by weight, the amount of soft segments is 15 to 85 percent by weight, and the total amount of the hard and soft segments is at least 80 percent by weight, the weights being based on the weight of a polyurethane polymer from which the binder resin layer is derived. In some embodiments, the polyurethane polymer from which the binder resin layer is derived contains less than 20 percent by weight hard segments and 15 to 90 percent by weight soft segments. In some embodiments, the polyurethane polymer from which the binder resin layer is derived contains a total amount of hard and soft segments in the polyurethane polymer of at least 80 percent by weight of the polymer.

The weight percent of the hard segment is calculated by adding the weight percent of diols having molecular weights of less than 600 g/mol and the weight percent of the isocyanate components.

In some embodiments, the polyurethane polymer has a change in storage modulus of less than 7 MPa from 25° C. to 175° C. In some embodiments, the polyurethane polymer has a change in storage modulus of less than 5 MPa from 25° C. to 175° C. In some embodiments, the resulting binder resin layer has a storage modulus at 175° C. of greater than 0.2 MPa. In some embodiments, the resulting binder resin layer has a storage modulus at 175° C. of greater than 1 MPa. In some embodiments, the resulting binder resin layer has a storage modulus at 175° C. of greater than 3 MPa.

In some embodiments, the binder resin layer has a thickness of 50 to 600 micrometers, and includes microspheres having an average diameter of about 30 to 200 micrometers.

The binder layer is typically formed on the transfer carrier after the transparent microspheres have been partially embedded in the release layer of the transfer carrier. The binder layer is typically coated over the partially embedded transparent microspheres by a direct coating process but could also be provided over the transparent microspheres via thermal lamination either from a separate carrier or by first forming the binder layer on a separate substrate from which it is subsequently transferred to cover the transparent microspheres.

Substrate Layers

The presently disclosed microsphere coated articles and transfer articles can optionally comprise one or more substrate layer(s). Examples of suitable substrate layers include but are not limited to those selected from at least one of fabrics (including synthetics, non-synthetics, woven and non-woven such as nylon, polyester, etc.), polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers such as natural and synthetic rubber, and the like; and open-cell foams and closed cell foams, including for example, polyurethane foam, polyethylene foam, foamed rubber, and the like. The substrates may, for example, be in the form of a clothing article or footwear; automobile, marine, or other vehicle seat coverings; automobile, marine, or other vehicle bodies; orthopedic devices; electronic devices, hand held devices, household appliances, and the like.

In the presently disclosed transfer and microsphere coated articles, the plurality of transparent microspheres are typically provided as a continuous layer in some embodiments or as a discontinuous layer in some embodiments. The binder layer is continuous in some embodiments or discontinuous in some embodiments. Typically, the substrate layer, when present, is continuous, although it may be discontinuous. In the presently disclosed microsphere coated articles all layers can optionally be continuous or discontinuous.

In some embodiments, where the article is bonded to a substrate layer, the presently disclosed article can be thermally bonded to various substrates without distortion of or other defects in the article. For example, in some embodiments the presently disclosed articles can be heat bonded to at least one substrate.

Second Layer

In some embodiments, the presently disclosed articles include a second layer disposed along the second major surface of the binder layer. In some embodiments, the second layer is a flexible material. Non-limiting exemplary flexible materials useful in the second layer in the present disclosure include polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof. In some embodiments, the polymer matrix composites include nanoparticles in resins, fibers in resins, and the like. Combinations can include any combinations of materials, such as interpenetrating networks, dual cure systems, and the like.

Graphic Layer Options

The present disclosed binder layer can optionally also perform the function of acting as an adhesive for a desired substrate and/or further comprise pigment(s) such that it also has a graphic function.

The binder layer, when selected to function also as a substrate adhesive, may be, for example, pigmented and provided in the form of an image, such as, for example, by screen printing the adhesive in the form of a graphic for transfer to a separate substrate. However, the binder layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the binder layer opposite the plurality of transparent microspheres by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

A colored polymeric layer(s) may be included in the articles of the present disclosure by a number of procedures. For example, a transfer carrier can have a layer of transparent microspheres embedded in the release layer thereof, following which the microsphere embedded surface of the release layer is coated with a transparent layer of binder. This microsphere and adhesive coated transfer carrier can function as a casting liner by coating, for example, a continuous colored plasticized vinyl layer over the binder layer and wet laminating a woven or non-woven fabric thereover.

Another method involves providing graphic layers (discontinuous colored polymeric layers, for example) on the binder layer prior to casting a continuous colored plasticized vinyl layer to approximate the image of leather, for example.

Optional Adhesive Layer(s)

The presently disclosed microsphere coated article and transfer article may each optionally further comprise one or more adhesive layers in addition to the binder layer. A substrate adhesive layer, for example, may optionally be included in the article in order to provide a means for bonding the binder layer or the layer(s) of material optionally bonded to the binder layers to a substrate. These optional adhesive layer(s) may be optionally present when, for example, the binder layer cannot function also as an adhesive for a desired substrate. A substrate adhesive layer (as well as any other optional adhesive layers) may comprise the same general types of polymeric materials used for the binder layer and may be applied following the same general procedures. However, each adhesive layer used must be selected such that it will adhere the desired layers together. For example, a substrate adhesive layer must be selected such that it can adhere to an intended substrate as well as to the other layer to which it is bonded. The substrate adhesive layer, when present, may be continuous in some embodiments or discontinuous in some embodiments.

Adhesives useful in the presently disclosed adhesive layer(s) include polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. Heat activated adhesives are non-tacky at room temperature but become tacky and capable of bonding to a substrate at elevated temperatures. These adhesives usually have a glass transition temperature (Tg) or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Reinforcing Layer(s)

Optional layers may be included in the presently disclosed microsphere coated article and transfer article to, for example, enhance the ability to separate the transfer carrier from the layer of a plurality of transparent microsphere. Such an optional layer which in such an article can function as a reinforcing layer would typically be positioned in between the plurality of transparent microspheres and a substrate adhesive layer. Examples of useful reinforcing layers would include additional substrate layer(s), for example.

Embossing

The articles of the present disclosure may optionally be embossed. The embossing procedure would typically involve subjecting the article, bonded to an embossable substrate, and with the transfer carrier removed, to heat and pressure such as by a heated patterned roller assembly or a patterned heated platen press. For embossed articles, it is preferable that the binder layer not be melted during the embossing operation, to preserve the microsphere embedment level, while at the same time being flexible enough to be deformed without cracking. Another method of embossing would be to thermally laminate the transfer article to an irregular substrate such as, for example, a coarse fabric such that after the transfer carrier is removed the surface is conformed to the irregular layer below it. In some embodiments, thermoforming can be used when processing the presently disclosed articles and transfer articles.

For some applications, it can be desirable to obtain specific bead surface area coverages. In some embodiments, at least about 40% of the surface of the article is covered with the plurality of microspheres. In some embodiments, at least about 60% of the surface of the article is covered with the plurality of microspheres. In some embodiments, the article has at least a portion of a first major surface covered with the plurality of microspheres with coverage greater than or equal to 30% of that portion of the first major surface. In some embodiments, the article has at least a portion of a first major surface covered with the plurality of microspheres with coverage less than or equal to 50% of that portion of the first major surface. In some embodiments, the percent of area covered by microspheres in one area of the film can be one coverage density, such as about 71%. In some embodiments, the percent of area covered by microspheres in another area of the film can be the same or different coverage density, such as 47%. In some embodiments, the percent of area covered by microspheres in yet another area of the film can be the same or different coverage density, such as 44%. In some embodiments, the presently disclosed articles include a plurality of microspheres that are substantially uniformly spaced.

The articles of the present disclosure are also preferably resistant to solvents. For example, articles made according to the present disclosure having less than 10% or less microsphere loss from a surface that is exposed to a solvent, such as methyl ethyl ketone, according to the Solvent Resistant Testing disclosure included below, are considered to be resistant to solvents. In some embodiments, it is particularly preferable that the presently disclosed articles are resistant to organic solvents.

In some embodiments, the presently disclosed articles have a coefficient of friction of less than or equal to 0.3. In some preferred embodiments, the presently disclosed articles have a coefficient of friction of less than or equal to 0.2.

In some embodiments, the article has a change in storage modulus of less than 7 MPa from 25° C. to 175° C. In some embodiments, the article has a change in storage modulus of less than 5 MPa from 25° C. to 175° C. In some embodiments, the article has a storage modulus at 175° C. of greater than 0.2 MPa. In some embodiments, the article has a storage modulus at 175° C. of greater than 1 MPa. In some embodiments, the article has a storage modulus at 175° C. of greater than 3 MPa.

In some embodiments, the binder resin layer has a thickness of 50 to 600 micrometers, and includes microspheres having an average diameter of about 30 to 200 micrometers.

A non-limiting list of exemplary embodiments and combinations of exemplary embodiments of the present disclosure are disclosed below:

Embodiment 1

An article comprising:
(a) a binder resin layer comprising an aliphatic polyurethane polymer comprising a plurality of soft segments, and a plurality of hard segments, wherein the soft segments comprise poly(alkoxy) polyol, and wherein the poly(alkoxy) polyol is essentially free of crosslinker; and
(b) a plurality of microspheres partially embedded and adhered to a first major surface of the binder resin layer,
wherein the specific chemical identities and relative amounts of the segments and moieties of the aliphatic polyurethane polymer are sufficient to impart a glass transition temperature of 10° C. or less in the article and a storage modulus in the article that changes less than 15 MPa from 25° C. to 175° C.

Embodiment 2

The article of Embodiment 1 wherein the amount of hard segments is 15 to 85 percent by weight, the amount of soft segments is 15 to 85 percent by weight, and the total amount of the hard and soft segments being at least 80 percent by weight, the weights being based on the weight of the polyurethane polymer.

Embodiment 3

The article of Embodiments 1 or 2 wherein the change in storage modulus is less than 7 MPa from 25° C. to 175° C.

Embodiment 4

The article of Embodiments 1 or 2, wherein the change in storage modulus is less than 5 MPa from 25° C. to 175° C.

Embodiment 5

The article of any of the preceding embodiments wherein the storage modulus at 175° C. is greater than 0.2 MPa.

Embodiment 6

The article of any of the preceding embodiments wherein the storage modulus at 175° C. is greater than 1 MPa.

Embodiment 7

The article of any of the preceding embodiments wherein the storage modulus at 175° C. is greater than 3 MPa.

Embodiment 8

The article of any of the preceding embodiments wherein the plurality of microspheres are selected from at least one of glass, polymers, glass ceramics, ceramics, metals and combinations thereof.

Embodiment 9

The article of any of the preceding embodiments wherein at least about 60% of the surface of the article is covered with the plurality of microspheres.

Embodiment 10

The article of any of the preceding embodiments further comprising a second layer disposed along the second major surface of the first binder layer.

Embodiment 11

The article of Embodiment 10 wherein the second layer comprises a flexible material.

Embodiment 12

The article of Embodiment 10 or 11 wherein the article is flexible.

Embodiment 13

The article of any of the preceding embodiments wherein the article is resistant to organic solvents.

Embodiment 14

The article of any of the preceding embodiments wherein the article exhibits a coefficient of friction of less than or equal to 0.3.

Embodiment 15

The article of any of the preceding embodiments wherein the article is heat bonded at elevated temperatures to a substrate.

Embodiment 16

The article of any of the preceding embodiments wherein the soft segments have a number average molecular weight of less than 10,000 g/mol, and wherein the hard segments are derived from diols having molecular weights of less than 600 g/mol.

Embodiment 17

The article of any of the preceding embodiments wherein the soft segments have a number average molecular weight of at least 500 g/mol.

Embodiment 18

The article of any of Embodiments 1 to 16 wherein the soft segments have a number average molecular weight of 500 g/mol to 6,000 g/mol.

Embodiment 19

The article of any of Embodiments 1 to 16 wherein the soft segments have a number average molecular weight of 500 g/mol to 3,000 g/mol.

Embodiment 20

The article of any of the preceding embodiments wherein the binder resin layer has a thickness of 50 to 600 micrometers, and includes microspheres having an average diameter of about 30 to 200 micrometers.

Embodiment 21

The article of any of the preceding embodiments wherein the polyurethane polymer contains less than 20 percent by weight hard segments and 15 to 90 percent by weight soft segments.

Embodiment 22

The article of any of the preceding embodiments wherein the total amount of hard and soft segments in the polyurethane polymer is at least 80 percent by weight of the polymer.

Various modifications and alterations of this invention will become apparent to those skilled in the art without departing from the scope and spirit of this invention.

EXAMPLES

Materials

| Designation | Description |
| --- | --- |
| ICN 1 | A solvent free, polyfunctional, aliphatic isocyanate resin based on hexamethylene diisocyanate (HDI) having an equivalent weight of approximately 193, an NCO content of 21.8%, and a monomeric HDI content of 0.2% maximum, available under the trade designation DESMODUR N3300A from Bayer MaterialScience LLC, Pittsburgh, PA. |
| ICN 2 | A liquid cycloaliphatic diisocyanate, dicyclohexylmethane diisocyanate, having an equivalent weight of 132 maximum, an NCO content of 31.8% minimum, and a solidification point of 25° C., available under the trade designation DESMODUR W from Bayer MaterialScience LLC, Pittsburgh, PA. |
| ICN 3 | A monomeric aromatic diisocyanate mixture of 4,4'-diphenylmethane diisocyanate and 2,4'-diphenylmethane diisocyanate having an equivalent weight of approximately 126 and an NCO content of 33.4%, available under the trade designation MONDUR ML from Bayer MaterialScience LLC, Pittsburgh, PA. |
| POH 1 | Polytetramethylene ether glycol, a waxy solid having a molecular weight of 625-675, a hydroxyl number of 166-180, and a melting point of 11-19° C., available under the trade designation TERATHANE 650 from Invista, Wichita, KS. |
| POH 2 | A liquid diol having a molecular weight of 90 and a boiling point of 23° C., available as 1,4-butanediol from Chemtura Corporation, Middlebury, CT. |
| POH 3 | A liquid triol having a molecular weight of 90.1 g/mol and a boiling point of 290° C. available as glycerol from Sigma-Aldrich, St. Louis, MO. |
| POH 4 | A polyester diol having a functionality of 2 and a molecular weight of 2040 g/mol available under the trade designation URETHHALL 4050-55D from HallStar, Chicago, IL. |
| T12 | dibutyltin dilaurate (DBTDL), a liquid catalyst, available under the trade designation DABCO T-12 from Air Products and Chemicals Inc., Allentown, PA. |

| Designation | Description |
| --- | --- |
| Borosilicate glass microsphere beads | Type 1 borosilicate glass microsphere beads having an average size in the range of 38-75 micrometers, a refractive index of 1.47 as determined by the standard Becke line method, and a density of 2.23 g/cc, obtained from Mo Sci Incorporated, Rolla, MO. |
| Borosilicate glass powder | Milled borosilicate glass powder having a size distribution of less than 200 mesh and density of 2.23 g/cc, available under the trade designation PYREX 7740 from Strategic Materials Incorporated, Houston TX. |
| Soda lime silicate microsphere beads | Silane treated soda lime silicate microsphere beads having an average size in the range of 44-53 micrometers, a refractive index of 1.52 as determined by the standard Becke line method, and a density of 2.52 g/cc, obtained from Swarco Industries, Incorporated, Columbia, TN. |
| SILQUEST A1100 | Gamma-Aminopropyltrimethoxysilane, a clear liquid coupling agent, sold under the trade designation SILQUEST A1100 from Momentive Performance Materials Incorporated, Columbus, OH. |
| FP1 | A free-flowing, granular, fluorothermoplastic processing aid having a melting point of 110-126° C. and based on a copolymer of tetrafluoroethylene, hexafluoropropylene, and vinylidene fluoride, available under the trade designation 3M DYNAMAR Polymer Processing Additive FX 5912 from 3M Company, St. Paul, MN. |
| TPU | A translucent, polyester thermoplastic polyurethane (TPU) hot melt adhesive having a nominal thickness of 0.10 millimeters (0.004 inches), a Shore A Hardness of 70, a melting point of 86° C. (187° F.) and a glass transition temperature (Tg) of −30° C. (−20° F.), available under the trade designation ESTANE UB 410B TPU from Lubrizol Advanced Materials, Cleveland, OH. |
| TAIC | Triallyl isocyanurate |
| MIBK | Methyl isobutyl ketone |

Test Methods

Dynamic Mechanical Test (DMA)

Except where noted, free-standing bead films having thicknesses ranging from 0.25 to 0.55 mm (0.0098 to 0.0217 inches) were evaluated for their storage modulus (E') at room temperature (approximately 25° C.), and at 175° C. and glass transition temperature ($T_g$) using a dynamic mechanical analyzer (Model Q800 DMA, TA Instruments, New Castle, Del.) with a tensile grip separation distance of between 14.9 mm and 21.0 mm (0.59 to 0.83 inches), and a temperature ramp rate of 2° C./minute. The film samples had a width of 6.0 mm to 6.4 mm (0.24 to 0.25 inches). Samples were run at a frequency of 1.0 Hz through a temperature sweep starting at −50° C. up to 200° C. or until they yielded. For each example evaluated one sample was run.

Flexibility Testing

Except where noted, free-standing bead films having thicknesses ranging from 0.25 to 0.55 mm (0.0098 to 0.022 inches) were evaluated for their ability to be repeatedly flexed according to ASTM D6182-00. A pass indicates the sample performed 100,000 flex cycles with no visible damage.

Coefficient of Friction Testing

Except where noted, free-standing bead film samples were evaluated for coefficient of friction using a table top peel tester. 3.2 mm (0.013 inch) thick elastomeric foam having a density of about 0.25 g/cc was bonded to a flat steel substrate measuring 63.5 mm (2.5 inches) square, having a thickness of about 6 mm (0.024 inches), and weighing approximately 200 grams including the foam. Next, a free-standing bead film having a length of 63.5 mm (2.5 inches) that was approximately 5 mm longer than the substrate was place over the foam covered surface of the substrate such that the film was wrapped around the leading edge of the substrate. A hole was cut in the film to accommodate the pin by which the substrate was pulled during testing. This test article was placed with the film side down on an isopropyl alcohol wiped glass surface measuring at least 15.2 cm by 25.4 cm (6 inches by 10 inches). A table top peel tester was used in the coefficient of friction mode to pull the test article across the glass surface at a rate of about 2.29 meters/minute (90 inches/minute) for at least about 5 seconds. The transducer was calibrated with the force from the weight of the steel substrate with foam as 1.00. In this way pulling forces were directly read out as coefficient of friction (COF). The dynamic (kinetic) coefficient of friction was determined by evaluating the graph of the COF values beginning one second after the start of the measurement. Data was collected at a rate of ten readings/second and the average was recorded. Three samples were run for each film and the average of these three coefficient of friction measurements was reported. Values of 0.3 or less are desirable.

Solvent Resistance Testing

Except where noted, free-standing bead films were evaluated for solvent resistance as described in ASTM D5402-06 (2011) Method A using the following parameters. The solvent was MEK (methyl ethyl ketone). A cheesecloth was used. The sample size was 5.1 by 2.5 cm (2 inches by 1 inch). The tested samples were evaluated under with a microscope at 100× using reflected light. The area rubbed with solvent was inspected for loss of beads by counting the number of beads in the field. If 10% or less of the beads were observed to be missing the sample was rated "Pass". If more than 10% of the beads were observed to be missing the sample was rated "Fail".

Retroreflectivity Test

Measurements of the coefficient of retroreflection (Ra) were made directly on the beaded surface of various constructions according to the procedure established in Procedure B of 10 ASTM Standard E 809-94a, measured at an entrance angle of −4.0 degrees and an observation angle of 1 degree. The photometer used for those measurements is described in U.S. Defensive Publication No. T987,003. Ra was reported in Candelas/square meter/lux. Retroeflective articles typically exhibit a coefficient of retroreflection of more than 2.

Method for Making Bead Carrier
Borosilicate Bead Carrier

Borosilicate glass powder was passed through a flame treater twice by passing them through a hydrogen/oxygen flame at a rate of 3 grams/minute to form microspheres and were collected in a stainless steel container whereupon metallic impurities were removed using a magnet. The resulting glass microspheres were treated with 600 ppm of SILQUEST A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and were free flowing. The resulting transparent silane treated microspheres were cascade coated using a mechanical sifter onto a transfer carrier comprising a polyethylene coated polyester film substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Soda Lime Silicate Bead Carrier

Soda lime silicate microsphere beads were used as received to prepare a bead carrier in the following manner. The glass microsphere beads were treated with 600 ppm of SILQUEST A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and were free flowing. The resulting transparent silane treated microspheres were cascade coated using a mechanical sifter onto a transfer carrier comprising a polyethylene coated polyester film substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Example 1

A 100% solids two-part polyurethane was created by adding the following vacuum degassed raw materials to a MAX 40 Speedmixer cup (Flacktek Inc, Landrum, S.C.) in this order: 12.22 g ICN 2, 2.90 g ICN 1, 24.52 g POH 1, and 0.35 g POH 2. Vacuum was applied directly to the cup for 15 seconds and then mixed at 2500 rpm for 30 seconds under full vacuum in a DAC 150.1 FVZ-K Speedmixer (Flacktek Inc, Landrum, S.C.). The sample was removed from the Speedmixer, 36 microliters T12 was added using a micropipette then the cup was again placed under vacuum for 15 seconds and mixed for an additional 30 seconds at 2500 rpm under full vacuum. The resulting mixture was applied to a 30.5 cm (12 inches) wide notchbar coater between a silicone-coated polyester film release liner and a borosilicate bead carrier prepared as described above with a gap of 0.33 mm (0.013 inches) greater than the combined thickness of the liners at a rate of about 3.0 meters/minute (10 feet/minute). The film was cured at room temperature for four minutes, followed by one hour in a forced air oven at 80° C. A 0.38 mm (0.015 inches) thick, free-standing bead film of 100% solids-based, two part polyurethane binder resin with partially embedded borosilicate microsphere beads on one side was obtained by removal of both the transfer carrier and the silicone-coated polyester film release liner.

Example 2

A 100% solids two-part polyurethane was created by adding the following vacuum degassed raw materials to a MAX 40 Speedmixer cup (Flacktek Inc, Landrum, S.C.) in this order: 12.32 g ICN 2, 2.90 g ICN 1, 23.07 g POH 1, and 1.71 g POH 2. Vacuum was applied directly to the cup for 15 seconds and then mixed at 2500 rpm for 30 seconds under full vacuum in a DAC 150.1 FVZ-K Speedmixer (Flacktek Inc, Landrum, S.C.). The sample was removed from the Speedmixer, 36 microliters T12 was added using a micropipette then the cup was again placed under vacuum for 15 seconds and mixed for an additional 30 seconds at 2500 rpm under full vacuum. The resulting mixture was applied to a 30.5 cm (12 inches) wide notchbar coater between a silicone-coated polyester film release liner and a borosilicate bead carrier prepared as described above with a gap of 0.33 mm (0.013 inches) greater than the combined thickness of the liners at a rate of about 3.0 meters/minute (10 feet/minute). The film was cured at room temperature for four minutes, followed by one hour in a forced air oven at 80° C. A 0.38 mm (0.015 inches) thick, free-standing bead film of 100% solids-based, two part polyurethane binder resin with partially embedded borosilicate microsphere beads on one side was obtained by removal of both the transfer carrier and the silicone-coated polyester film release liner.

Example 3

A 100% solids two-part polyurethane was created by adding the following vacuum degassed raw materials to a MAX 40 Speedmixer cup (Flacktek Inc, Landrum, S.C.) in this order: 12.33 g ICN 2, 2.90 g ICN 1, 23.80 g POH 1, and 0.97 g POH 2. Vacuum was applied directly to the cup for 15 seconds and then mixed at 2500 rpm for 30 seconds under full vacuum in a DAC 150.1 FVZ-K Speedmixer (Flacktek Inc, Landrum, S.C.). Sample was removed from the Speedmixer, 36 microliters T12 was added using a micropipette then the cup was again placed under vacuum for 15 seconds and mixed for an additional 30 seconds at 2500 rpm under full vacuum. The resulting mixture was applied to a 30.5 cm (12 inches) wide notchbar coater between a silicone-coated polyester film release liner and a borosilicate bead carrier prepared as described above with a gap of 0.33 mm (0.013 inches) (greater than the combined thickness of the liners) at a rate of about 3.0 meters/minute (10 feet/minute). The film was cured at room temperature for four minutes, followed by one hour in a forced air oven at 80° C. A 0.38 mm (0.015 inches) thick, free-standing bead film of 100% solids-based, two part polyurethane binder resin with partially embedded borosilicate microsphere beads on one side was obtained by removal of both the transfer carrier and the silicone-coated polyester film release liner.

Example 4

A 100% solids two-part polyurethane was created by adding the following vacuum degassed raw materials to a MAX 40 Speedmixer cup (Flacktek Inc, Landrum, S.C.) in this order: 11.72 g ICN 2, 2.84 g ICN 1, 25.35 g POH 1, and 0.09 g POH 2. Vacuum was applied directly to the cup for 15 seconds and then mixed at 2500 rpm for 30 seconds under full vacuum in a DAC 150.1 FVZ-K Speedmixer (Flacktek Inc, Landrum, S.C.). The sample was removed from the Speedmixer, 36 microliters T12 was added using a micropipette then the cup was again placed under vacuum for 15 seconds and mixed for an additional 30 seconds at 2500 rpm under full vacuum. The resulting mixture was applied to a 30.5 cm (12 inches) wide notchbar coater between a silicone-coated polyester film release liner and a borosilicate bead carrier prepared as described above with a gap of 0.33 mm (0.013 inches) greater than the combined thickness of the liners at a rate of about 3.0 meters/minute (10 feet/minute). The film was cured at room temperature for four minutes, followed by one hour in a forced air oven at 100° C. A 0.38 mm (0.015 inches) thick, free-standing bead film of 100% solids-based, two part polyurethane binder resin with partially embedded borosilicate microsphere beads on one side was obtained by removal of both the transfer carrier and the silicone-coated polyester film release liner. Retroreflectivity (Ra) of Example 4 was tested and determined to be 0.0 Candelas/square meter/lux according to the Retroreflectivity Test shown above.

Example 5

A 100% solids two-part polyurethane was created by adding the following vacuum degassed raw materials to a MAX 40 Speedmixer cup (Flacktek Inc, Landrum, S.C.) in this order: 10.36 g ICN 2, 2.99 g ICN 1, 26.00 g POH 1, and 0.65 g POH 2. Vacuum was applied directly to the cup for 15 seconds and then mixed at 2500 rpm for 30 seconds under full vacuum in a DAC 150.1 FVZ-K Speedmixer (Flacktek Inc, Landrum, S.C.). The sample was removed from the Speedmixer, 36 microliters T12 was added using a micropipette then the cup was again placed under vacuum for 15 seconds and mixed for an additional 30 seconds at 2500 rpm under full vacuum. The resulting mixture was applied to a 30.5 cm (12 inches) wide notchbar coater between a silicone-coated polyester film release liner and a borosilicate bead carrier prepared as described above with a gap of 0.33 mm (0.013 inches) greater than the combined thickness of the liners at a rate of about 3.0 meters/minute (10 feet/minute). The film was cured at room temperature for four minutes, followed by one hour in a forced air oven at 80° C. A 0.38 mm (0.015 inches) thick, free-standing bead film of 100% solids-based, two part polyurethane binder resin with partially embedded borosilicate microsphere beads on one side was obtained by removal of both the transfer carrier and the silicone-coated polyester film release liner.

Comparative Example 1

A 100% solids two-part polyurethane was attempted by adding the following vacuum degassed raw materials to a MAX 40 Speedmixer cup (Flacktek Inc, Landrum, S.C.) in this order: 0.92 g POH 3, 1.56 g POH 2, 26.20 g POH 4, and 18 microliters T12 was added using a micropipette. Vacuum was applied directly to the cup for 15 seconds and then mixed at 2500 rpm for 30 seconds under full vacuum in a DAC 150.1 FVZ-K Speedmixer (Flacktek Inc, Landrum, S.C.). The sample was removed from the Speedmixer, and 12.0 g ICN 3 was added then the cup was again placed under vacuum for 15 seconds and mixed for an additional 30 seconds at 2500 rpm under full vacuum. The resulting mixture cured in the cup to a solid mass.

Comparative Example 2

A 100% solids two-part polyurethane was created by adding the following vacuum degassed raw materials to a MAX 40 Speedmixer cup (Flacktek Inc, Landrum, S.C.) in this order: 7.05 g ICN 2, 0.91 g ICN 1, 9.17 g POH 1, and 1.25 g POH 2. Vacuum was applied directly to the cup for 15 seconds and then mixed at 2500 rpm for 30 seconds under full vacuum in a DAC 150.1 FVZ-K Speedmixer (Flacktek Inc, Landrum, S.C.). The sample was removed from the Speedmixer, 16.5 microliters T12 was added using a micropipette then the cup was again placed under vacuum for 15 seconds and mixed for an additional 30 seconds at 2500 rpm under full vacuum. The resulting mixture was applied to a 30.5 cm (12 inches) wide notchbar coater between a silicone-coated polyester film release liner and a borosilicate bead carrier prepared as described above with a gap of 0.13 mm (0.005 inches) greater than the combined thickness of the liners at a rate of about 3.0 meters/minute (10 feet/minute). The film was cured at room temperature for four minutes, followed by one hour in a forced air oven at 80° C. A 0.15 mm (0.006 inches) thick, free-standing bead film of 100% solids-based, two part polyurethane binder resin with partially embedded borosilicate microsphere beads on one side was obtained by removal of both the transfer carrier and the silicone-coated polyester film release liner.

TABLE 1

Properties of Free-standing Bead Films

| | DMA Tg (° C.) | DMA E' at 25 C. (MPa) | DMA E' at 175 C. (MPa) | Delta E' (MPa) | Flex Test | COF | Solvent Resistance |
|---|---|---|---|---|---|---|---|
| Example 1 | −0.77 | 7.59 | 1.98 | 5.61 | Minor defect** | 0.161 | Pass |
| Example 2 | −2.77 | 4.80 | 0.37 | 4.43 | Pass | 0.173 | Pass |
| Example 3 | 1.05 | 12.55 | 2.31 | 10.24 | Pass | 0.176 | Pass |
| Example 4 | −7.00 | 7.88 | 2.22 | 5.65 | Pass | 0.155 | Pass |
| Example 5 | −13.84 | 2.39 | 0.33 | 2.06 | Pass | 0.186 | Pass |
| Comparative Example 1* | — | — | — | — | — | — | — |
| Comparative Example 2 | 17.25 | 29.14 | 1.96 | 27.19 | Fail | NT | NT |

*Film could not be made with the presently disclosed process so there is no data available.
**Example 1 exhibited a small fracture but did not break apart like the failure noted for Comparative Example 2.
NT: Not Tested Example 6

A 20% solids (w/w) solution of FP 1 in MIBK with 1.0% TALC (w/w based on FP1) was prepared by combining the materials in a sealed jar on a roller overnight at room temperature (ca. 23° C. (73° F.)). The resulting solution was applied onto a 35.6 cm (14 inches) wide soda lime bead carrier, prepared as described above, using a coating line equipped with a notch bar coating head and three drying ovens set at 90° C., 90° C., and 90° C. respectively at a rate of 152 cm/minute (5 feet/minute). The total drying time was 6 minutes. The gap setting on the coating head was varied from 0.051 mm to 0.51 mm (0.002 inches to 0.020 inches). After drying, the exposed fluoropolymer surface was treated with e-beam at 220 kV accelerating voltage, a line speed of 6.64 meters/minute (21.8 feet/minute), and a dose of 10

Mrad using a CB300 E-Beam device (Energy Sciences, Incorporated, Wilmington, Mass.). Next, a 100% solids, two part polyurethane was prepared by adding the following vacuum degassed materials to a MAX 60 Tall Speedmixer cup (Flacktek Inc, Landrum, S.C.) in order as follows: 11.72 g ICN 2, 2.84 g ICN 1, 25.35 g POH 1, and 0.09 g POH 2. Vacuum was applied directly to the cup for 15 seconds and the contents then mixed at 2500 rpm for 30 seconds under full vacuum in a DAC 150.1 FVZ-K Speedmixer (Flacktek Inc, Landrum, S.C.). The sample was removed from the Speedmixer, 36 microliters T12 was added using a micropipette, followed by degassing the cup under vacuum for 15 seconds then mixing for an additional 30 seconds at 2500 rpm under full vacuum.

The resulting 100% solids, two part polyurethane resin mixture was coated between the exposed, treated surface of the fluoropolymer coated soda lime bead carrier prepared as described above and the exposed cloth surface of a tricot knit cloth (94% polyester/6% nylon, available from Apex Mills Corporation, Inwood, N.Y.) using a 45.7 cm (18 inches) wide notchbar coater with a gap of 0.13 mm (0.005 inches) greater than the combined thickness of the liners at a rate of about 3.0 meters/minute (10 feet/minute). A silicone-coated polyester film release liner was also introduced on the side of the cloth opposite the resin contacting side.

The coated construction obtained was cured at room temperature for four minutes, followed by one hour in a forced air oven at 100° C. (212° F.) to provide a transfer article having soda lime silicate beads which were partially embedded in polyethylene on one side and in the fluoropolymer binder resin layer on the other, a coating of polyurethane resin in a tricot knit cloth over the fluoropolymer binder resin layer, and a silicone-treated polyester release film liner over the exposed polyurethane surface.

A 0.61 mm (0.024 inches) thick tricot knit cloth-backed, bead film having a fluoropolymer binder resin uniformly coated on one side with partially embedded soda lime silicate microspheres and on the other side with a polyurethane resin in tricot knit cloth was obtained by removal of both the transfer carrier and the silicone-coated polyester film release liner.

Comparative Example 3

An attempt to repeat Example 6 was made with the following modifications. The 100% solids, two-part polyurethane was prepared using 35.50 g ICN 2, 4.50 g POH 3, 20.00 g POH 1, and 54 microliters T12; the notchbar coating gap thickness was 0.33 mm (0.013 inches); no FP1 coating existed on the bead liner; and no knit cloth reinforcement was employed. The resulting material did not form a film and was a mass of large bubbles containing regions of sticky, uncured resin. The sample was placed in a 100° C. (212° F.) forced air oven for an additional 4 hours with no improvement.

TABLE 2

Properties of Cloth Reinforced and Free-standing Bead Films

| | DMA Tg (° C.) | DMA E' at 25 C. (MPa) | DMA E' at 175 C. (MPa) | Delta E' (MPa) | Flex Test | COF | Solvent Resistance |
|---|---|---|---|---|---|---|---|
| Example 6 | −7.36 | 11.78 | 5.56 | 6.22 | Pass | 0.159 | Pass |
| Comparative Example 3* | — | — | — | — | — | — | — |

*Film could not be made with the presently disclosed process so no data was obtained.

What is claimed is:

1. An article comprising:
   (a) a binder resin layer comprising an aliphatic polyurethane polymer comprising a plurality of soft segments, and a plurality of hard segments, wherein the soft segments comprise poly(alkoxy) polyol, and wherein the poly(alkoxy) polyol is essentially free of crosslinker; and
   (b) a plurality of microspheres wherein the plurality of microspheres consists essentially of glass, glass ceramics, ceramics, or combinations thereof, wherein each microsphere is partially embedded and adhered to a first major surface of the binder resin layer,
   wherein the aliphatic polyurethane polymer has a glass transition temperature of 10° C. or less and the binder resin layer has a storage modulus that changes less than 15 MPa from 25° C. to 175° C., the portion of each microsphere partially embedded in the first major surface of the binder resin layer, and at least about 60% of the first major surface of the binder resin layer is covered with the plurality of microspheres is in direct contact with the binder resin layer.

2. The article of claim 1 wherein the amount of hard segments is 15 to 85 percent by weight, and the amount of soft segments is 15 to 85 percent by weight.

3. The article of claim 1 wherein the change in storage modulus is less than 7 MPa from 25° C. to 175° C.

4. The article of claim 1 wherein the change in storage modulus is less than 5 MPa from 25° C. to 175° C.

5. The article of claim 1 wherein the storage modulus of the binder resin layer at 175° C. is greater than 0.2 MPa.

6. The article of claim 1 wherein the storage modulus of the binder resin layer at 175° C. is greater than 3 MPa.

7. The article of claim 1 further comprising a second layer disposed along the second major surface of the binder resin layer.

8. The article of claim 7 wherein the second layer comprises a flexible material.

9. The article of claim 7 wherein the article is flexible.

10. The article of claim 1 wherein the article is resistant to organic solvents.

11. The article of claim 1 wherein the article exhibits a coefficient of friction of less than or equal to 0.3.

12. The article of claim 1 wherein the soft segments have a number average molecular weight of less than 10,000 g/mol, and wherein the hard segments are derived from diols having molecular weights of less than 600 g/mol.

13. The article of claim 1 wherein the soft segments have a number average molecular weight of at least 500 g/mol.

14. The article of claim 1 wherein the soft segments have a number average molecular weight of 500 g/mol to 6,000 g/mol.

15. The article of claim 1 wherein the soft segments have a number average molecular weight of 500 g/mol to 3,000 g/mol.

16. The article of claim 1 wherein the binder resin layer has a thickness of 50 to 600 micrometers, and includes microspheres having an average diameter of about 30 to 200 micrometers.

17. The article of claim 1 wherein the polyurethane polymer contains less than 20 percent by weight hard segments.

18. The article of claim 1 wherein the binder resin layer comprises at least 80 percent by weight of the aliphatic polyurethane polymer.

19. The article of claim 1 wherein the article has a coefficient of retro reflection of less than or equal to 1.0 candelas/lux/square meter.

20. The article of claim 1, wherein the plurality of microspheres project from the surface of the article.

\* \* \* \* \*